Sept. 4, 1962            F. RELIFORD            3,052,131

HEDGE CLIPPER DRIVE ATTACHMENT FOR POWER MOWERS

Filed May 21, 1959                          2 Sheets-Sheet 1

Francis Reliford
INVENTOR.

BY *Clarence A. O'Brien*
*and Harvey B. Jacobson*
Attorneys

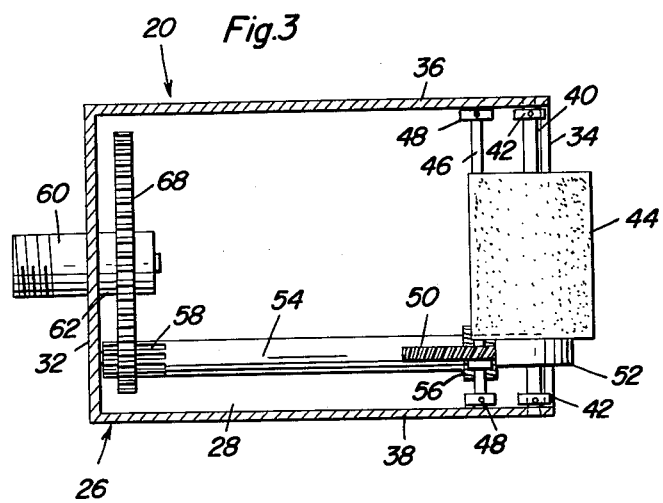
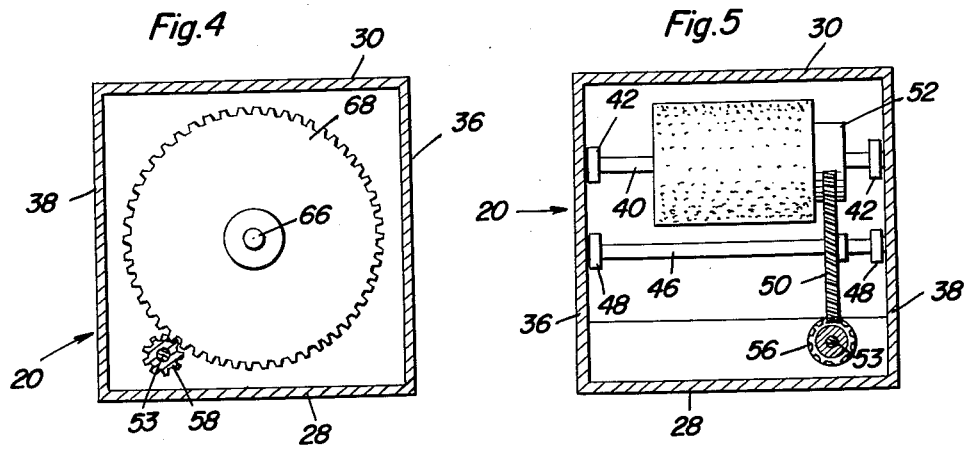

United States Patent Office 3,052,131
Patented Sept. 4, 1962

3,052,131
HEDGE CLIPPER DRIVE ATTACHMENT
FOR POWER MOWERS
Francis Reliford, 104 W. Rouse, Peoria Heights, Ill.
Filed May 21, 1959, Ser. No. 814,820
7 Claims. (Cl. 74—209)

This invention relates in general to new and useful improvements in hedge clippers, and mor specifically to a novel hedge clipper having a drive attachment which may be connected to a power mower.

For many years it was necessary to clip a hedge by hand. However, recently there have been developed electric clippers. While the electric hedge clippers in themselves perform satisfactorily, supplying the current to the electric hedge clippers has presented a problem. Normally a hedge is used as a border for a building lot. As a result, the hedge is disposed quite a distance away from the building which is the source of the electrical power for the hedge clippers. In view of this, it is necessary to provide the hedge clippers with a large length of electric cord, which cord must be strung out over the yard and constantly moved about shrubbery in the yard with numerous delays to the hedge clipping operation.

In view of the foregoing, the most feasible arrangement would be to provide a power source for hedge clippers which is readily available adjacent the hedge to be clipped. While at first this may appear to be impractical, normally the person having a hedge to be clipped has a readily available portable power source in the form of a lawn mower. It is therefore the primary object of this invention to provide a drive attachment for hedge clippers which may be readily attached to a lawn mower for driving the hedge clipper from the lawn mower.

Another object of the invention is to provide a drive attachment for hedge clippers, the drive attachment being of the type which may be readily mounted on a lawn mower and driven by the internal combustion engine of the lawn mower by engagement with the flywheel thereof.

Still another object of the invention is to provide an improved drive attachment for driving hedge clippers from a lawn mower, the drive attachment including a housing which may be readily mounted on the flywheel housing of a lawn mower, and which drive attachment includes a friction wheel which may be engaged with the flywheel of the lawn mower engine and driven therefrom.

A further object of the invention is to provide a hedge clipper assembly which may be used in conjunction with a lawn mower, the hedge clipper assembly including a power take-off unit which may be mounted on and connected to the internal combustion engine of the lawn mower for driving thereby, a flexible drive shaft and a hedge clipper unit, the flexible drive shaft being readily disconnectible from the power take-off unit whereby the major portion of the hedge clipper assembly may be stored when not in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged sectional view taken substantially upon the plane indicated by the section line 3—3 of FIGURE 2 and shows further the details of the power take-off drive unit;

FIGURE 4 is an enlarged transverse sectional view taken substantially upon the plane indicated by the section line 4—4 of FIGURE 2 and shows the arrangement of gears of the power take-off drive unit; and FIGURE 5 is an enlarged transverse sectional view taken substantially upon the plane indicated by the section line 5—5 of FIGURE 2 and shows further details of the power take-off drive unit.

Figure 1:
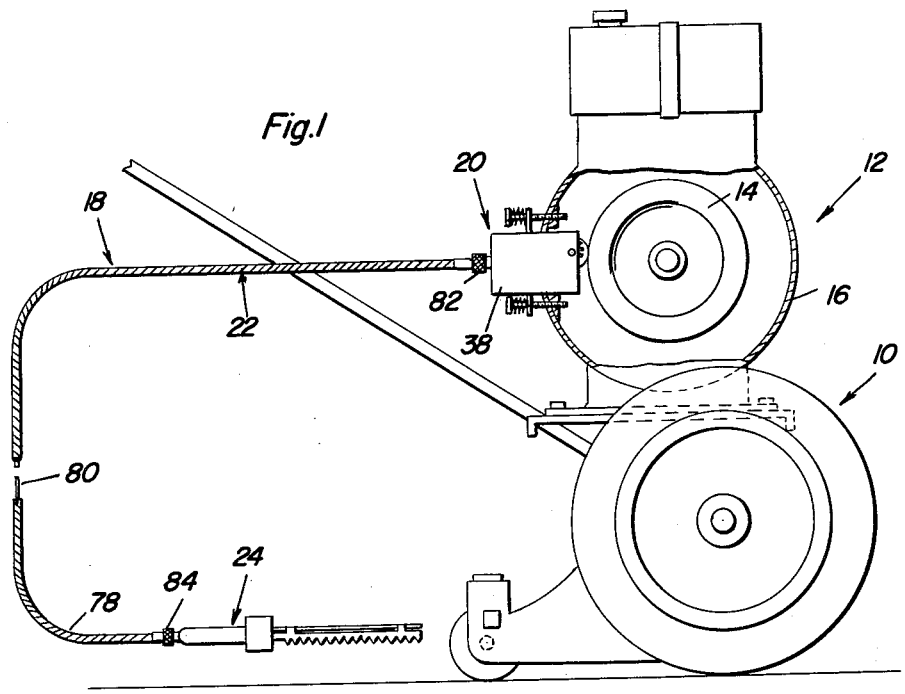
FIGURE 1 is a fragmentary elevational view of a conventional type of lawn mower and shows mounted thereon the hedge clipper attachment which is the subject of this invention, a portion of the flywheel housing of the internal combustion engine of the lawn mower being broken away and shown in section in order to illustrate the manner in which the hedge clipper drive attachment is secured thereto.
Figure 2:
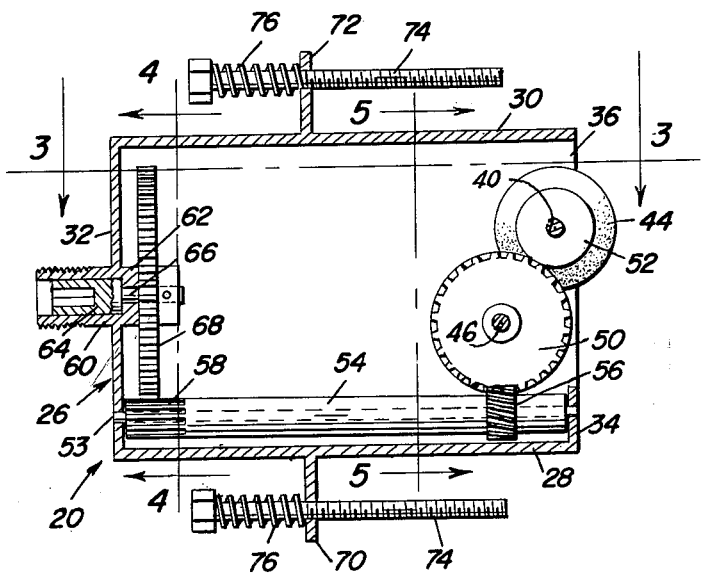
FIGURE 2 is an enlarged fragmentary sectional view taken through the power take-off unit of the hedge clipper drive attachment and shows the specific details of construction thereof.

Referring now to the drawings in detail, it will be seen that there is illustrated in FIGURE 1 a conventional type of lawn mower which is referred to in general by the reference numeral 10. The lawn mower 10 includes an internal combustion engine 12 for the operation thereof. The internal combustion engine 12 includes a flywheel 14 which is substantially encased within a flywheel housing 16.

Operatively associated with the internal combustion engine 12 is the hedge clipper assembly which is the subject of this invention, the hedge clipper assembly being referred to in general by the reference numeral 18. The hedge clipper assembly 18 includes a power take-off drive unit, generally referred to by the reference numeral 20, a flexible drive shaft assembly 22, and a clipper assembly 24.

Referring to FIGURES 2 through 5, inclusive, it will be seen that the power take-off drive unit 20 includes a casing or housing which is generally referred to by the numeral 26. The housing 26 includes a bottom wall 28, a top wall 30, a rear wall 32, a partial front wall 34, and a pair of side walls 36 and 38.

A main drive shaft 40 extends between the side walls 36 and 38 adjacent the front end of the housing 26 with the ends of the drive shaft 40 being rotatably journaled in the side walls 36 and 38. The drive shaft 40 is positioned fixedly with respect to the housing 26 by collars 42. A friction drive wheel 44 is secured to a central part of the main drive shaft 40.

An intermediate drive shaft 46 is disposed below and rearwardly of the main drive shaft 40. The ends of the inermediate drive shaft 46 are rotatably journaled in the side walls 36 and 38. The intermediate drive shaft 46 is positioned fixedly with respect to the side walls 36 and 38 by means of collars 48. The intermediate drive shaft 46 is provided with a gear 50 which is meshed with a drive roller 52 carried by the main drive shaft 40 so that the intermediate drive shaft 46 is drivingly connected to the main drive shaft 40.

A jack shaft 53 extends between the rear wall 32 and the front wall portion 34. Rotatably journaled on the jack shaft 53 is a tubular shaft 54 which is provided at one end thereof with a worm 56. The worm 56 is meshed with the gear 50. The opposite end of the tubular shaft 54 is provided with a pinion gear portion 58. Since the member 52 is a drive roller and not a gear, it may drive the gear 50 even though the gear 50 is cut to mesh with the worm 56.

The rear wall 32 is provided with a tubular fitting 60. The tubular fitting 60 is aligned with a boss 62 disposed on the front face of the rear wall 32. A coupling member 64 is rotatably journaled in the fitting 60 and includes a shaft portion 66 which extends through the boss 62. A gear 68 is secured on the shaft portion 66, the gear 68 being meshed with the pinion 58.

The bottom wall 28 in the housing 26 is provided with an attaching ear 70. A similar attaching ear 72 is secured to the top wall 30. Fastening screws 74 extend through the ears 70 and 72 and are threadedly engaged in the flywheel housing 16, said housing having an opening therein which slidably accommodates the housing or casing 26. The attaching screws 74 carry springs 76 which compressibly engage the ears 70 and 72 so as to resiliently urge the entire power take-off drive unit 20 towards the flywheel 14. In this manner the friction drive roller 44 may be retained in resilient engagement with the flywheel 14 to be driven thereby.

The flexible drive shaft assembly 22 includes an outer housing 78 and an inner cable 80. The outer housing 78 is provided at its ends with fittings 82 and 84 which are releasably connected to the fitting 60 and a similar fitting on the hedge clipper assembly 24. The flexible cable 80 is releasably connected to the coupling 64 and to a similar coupling which will be carried by the hedge clipper assembly 24. When it is not desired to utilize the hedge clipper, the drive shaft assembly 22 will be disconnected from the power take-off drive unit 20 and the drive shaft assembly 22 and the hedge clipper assembly 24 temporarily stored.

From the foregoing, it will be readily apparent that there has been devised a very simple attachment which may be secured to existing types of lawn mowers furnishing the necessary drive for hedge clippers. Since the lawn mower is portable, it may be moved along the hedge as the hedge clipping operation takes place.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A power take-off unit for driving a hedge clipper from a power lawn mower of the type including an engine having a flywheel with a flywheel housing provided with an opening therein, said unit comprising a casing mounted on the flywheel housing and slidable through the opening toward and from the flywheel, a friction gear rotatably journaled in said casing, a flexible clipper actuating shaft, means secured to said casing and rotatably supporting said actuating shaft, means in said casing connecting said friction gear to said actuating shaft and resilient means yieldingly urging said casing toward the flywheel in opposed relation thereto for engaging said friction gear therewith for actuation thereby.

2. The combination of claim 1 wherein the last named means includes headed bolts threadedly mounted on the housing on the interior thereof, apertured ears on said casing slideable on said bolts and springs on said bolts compressively engaged with said bolt heads and ears for urging said casing toward the flywheel.

3. A power take-off unit for driving a hedge clipper from a power lawn mower of the type comprising an engine including a flywheel operable in a housing having an opening therein, said unit comprising a casing slidable in the opening toward and from the flywheel, a friction gear rotatably mounted in said casing and engageable with the flywheel for actuation thereby, a flexible shaft, means secured to said casing and rotatably supporting said shaft, means in said casing connecting said friction gear to said shaft and means mounted on opposite sides of said casing yieldingly urging the latter toward the flywheel for engaging said friction gear therewith.

4. The combination of claim 3 wherein the last mentioned means includes bolts threaded for adjustment through a wall of the flywheel housing adjacent the opening, apertured ears on said casing slidable on said bolts and coil springs mounted on said bolts and compressively engaged with said ears for yieldingly urging said casing toward the flywheel.

5. The combination of claim 1 wherein said connecting means comprises a driven shaft and a further shaft each journaled in said casing, said further shaft comprising an axle mounted on said casing and a sleeve journaled on said axle, said sleeve having gears at its opposite ends connected to said friction gear and to said actuating shaft.

6. The combination of claim 5 wherein said casing is open at one end, said friction gear extending through said opening into engagement with said flywheel.

7. The combination of claim 6 including an intermediate shaft journaled on said casing and having an intermediate gear connected to one of said sleeve gears, said friction gear including driven and driving portions, said driven portion engaging said flywheel and said driving portion engaging said intermediate gear.

References Cited in the file of this patent

UNITED STATES PATENTS

| | | |
|---|---|---|
| 1,484,548 | Bickerstaff | Feb. 19, 1924 |
| 1,631,500 | Newmark | June 7, 1927 |
| 1,764,665 | Wennerberg | June 17, 1930 |
| 2,498,138 | Shepard et al. | Feb. 21, 1950 |
| 2,552,583 | Phelps | May 15, 1951 |
| 2,579,154 | Morrison | Dec. 18, 1951 |
| 2,596,359 | Bartlett | May 13, 1952 |
| 2,662,412 | Miller | Dec. 15, 1953 |
| 2,790,292 | Trecker | Apr. 30, 1957 |